United States Patent
Hines et al.

(10) Patent No.: US 6,247,678 B1
(45) Date of Patent: Jun. 19, 2001

(54) SHAPE MEMORY ALLOY ACTUATED FLUID CONTROL VALVE

(75) Inventors: Antonio Hines, Tampa, FL (US); Theodore J. Gausman, Concord; William H. Glime, Painesville, both of OH (US); Steven H. Hill, Nanaimo (CA); Bruce S. Rigsby, Charlestown, IN (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 09/431,694

(22) Filed: Nov. 1, 1999

(51) Int. Cl.[7] .................................................. F16K 31/64
(52) U.S. Cl. ......................... 251/11; 251/129.04; 60/527
(58) Field of Search ................................ 251/11, 129.04, 251/129.05; 60/527, 528, 529; 337/140

(56) References Cited

U.S. PATENT DOCUMENTS

| | | |
|---|---|---|
| 3,465,962 | 9/1969 | Matulich et al. . |
| 3,625,002 | 12/1971 | Davis . |
| 4,275,561 * | 6/1981 | Wang ....................................... 60/527 |
| 4,586,335 | 5/1986 | Hosoda et al. . |
| 4,750,520 | 6/1988 | Heim et al. . |
| 4,806,815 | 2/1989 | Honma . |
| 4,899,543 | 2/1990 | Romanelli et al. . |
| 5,211,371 | 5/1993 | Coffee . |
| 5,345,963 | 9/1994 | Dietiker . |
| 5,685,148 * | 11/1997 | Robert ..................................... 60/527 |
| 5,769,389 | 6/1998 | Jacobsen et al. . |
| 5,842,312 * | 12/1998 | Krumme et al. ..................... 52/167.1 |
| 5,865,418 | 2/1999 | Nakayama et al. . |
| 6,182,941 * | 2/2001 | Scheurenbrand et al. ........ 25/129.04 |

* cited by examiner

Primary Examiner—Joseph A. Kaufman
Assistant Examiner—Eric Keasel

(74) Attorney, Agent, or Firm—Calfee, Halter & Griswold LLP

(57) ABSTRACT

A fluid control valve having a shaped memory alloy (SMA) driven actuator is disclosed. The SMA driven actuator includes a first frame section coupled to a valve body and fixed in relation thereto, a second frame section coupled to a movable element of the valve body and movable in relation to the valve body, and a multiplicity of SMA wire sections coupling the first and second frame sections for moving the movable element from a biased first position to a second position when heated. An electrical controller controls the heating of the SMA wire sections by regulating current therethrough, preferably using pulse width modulation techniques. The electrical controller may be governed by a position measurement signal proportional to the position of the movable element to regulate current to the SMA drive element to position the movable element to a desired position. The position measuring signal may be provided from a position measuring element integral to the valve actuator. The valve actuator may also include a temperature controller governed by an electrical temperature signal provided by a temperature-sensing device in proximity to the SMA drive element to activate a cooling device for reducing the temperature surrounding the SMA drive element when activated. A digital selector switch may be used for generating a digital code of a selected heating rate which may govern the electrical controller to regulate current to the SMA drive element. The electrical controller may also be governed by both a position measurement and a temperature signal to regulate current to the SMA drive element and to control the cooling device to position the movable element to a desired position. The actuator may include at least one bobbin that is wound with a multiplicity of wire windings. A conductive material may be applied to the surface of grooved sections of the bobbin onto which the SMA wire windings are wound. Alternatively, the SMA wire may be coated with a conductive material and then wound about the bobbin and thereafter, the conductive material may be removed from the surface of the SMA wire not in contact with the bobbin.

30 Claims, 10 Drawing Sheets

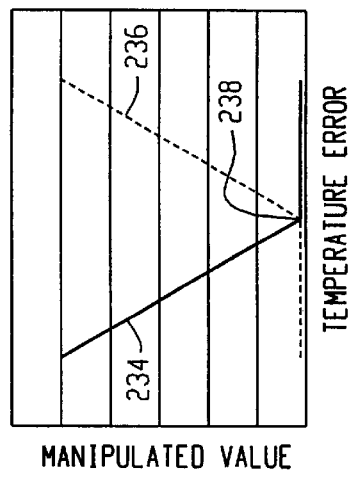
Fig. 9A
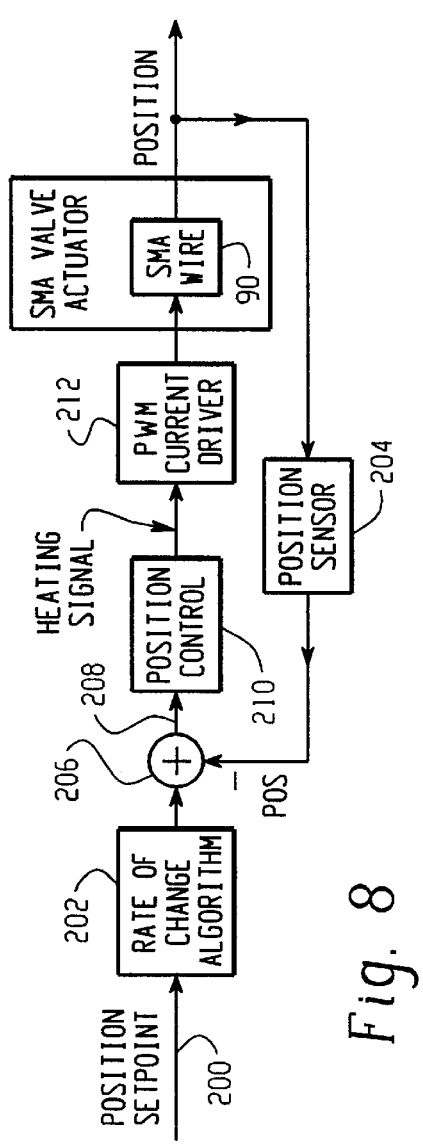
Fig. 8
Fig. 9

SHAPE MEMORY ALLOY ACTUATED FLUID CONTROL VALVE

BACKGROUND OF THE INVENTION

The present invention relates to the field of fluid control valves, in general, and more particularly to electrically controlled, shape memory alloy element actuated fluid control valves.

In general, manufacturing processes, like those involved in the semiconductor industry, for example, use fluid control valves in the liquid or gas delivery systems thereof. Typically, these valves are either pneumatically controlled or hydraulically controlled. A present obstacle in the use of the fluid control valves is the surge of flow associated with the rapid opening of the valve. The resulting turbulence and rapid pressure rise in the exiting fluid is undesirable for other system components. For example, in the semiconductor industry such turbulence and rapid pressure rise can cause particle "stir up" that can lead to contamination deposits on the wafers, which causes high rejection rates (i.e., low yields). As a result, several different methods have been used to better control the rate of opening of the valve. Among these are the use of a variable orifice which allows the valve piston to be driven at a slower rate, the use of a solenoid to control the flow of the fluid to the air operator, and the use of a metering valve to limit the fluid flow in the delivery system.

Recently, electrically driven fluid control valves utilizing a shaped memory alloy (SMA) drive element have been proposed for use in the fluid delivery systems of manufacturing processes. Shape memory alloys are materials that are capable of large and repeatable phase-transformation induced strains. One such valve integrates a single shape memory alloy wire into its valve housing within the biasing spring portion thereof. As proposed, the single SMA wire is essentially a rod having a diameter of approximately one-quarter of an inch. A special power supply with low voltage and high current requirements would be required to heat such a large diameter/mass of wire or rod. In addition, once heated the large mass of material would cool very slowly resulting in an undesirable slow closing of the valve. Another type of SMA driven fluid control valve provides for an SMA wire wrapped around the body of the valve but still integral to the valve. Both of these types provide for mechanically active SMA wire terminations which may lead to mechanical and/or electrical malfunctions. None of these proposed SMA actuated fluid control valves appear to offer commercially viable solutions to the aforementioned concerns with pneumatically or hydraulically driven fluid control valves presently used.

The present invention includes aspects which overcome the drawbacks of the prior proposed SMA actuator fluid control valves and offers further aspects not as yet considered in the prior art.

SUMMARY OF THE INVENTION

In accordance with the present invention, a fluid control valve having a shape memory alloy (SMA) driven actuator comprises a valve body including a movable element positionable in relation to the valve body to control fluid flow from an inlet port to an outlet port therethrough; a bias means for forcing the movable element to a first position; and a valve actuator including a first frame section coupled to the valve body and fixed in relation thereto; a second frame section coupled to the movable element and movable in relation to the valve body; and a multiplicity of SMA wire sections coupled between the first and second frame sections for moving the movable element from the biased first position to a second position when heated. The valve may further include an electrical controller for controlling the heating of the SMA wire sections by regulating current therethrough. The valve actuator may be enclosed within a housing which includes openings for allowing air to flow through the valve actuator.

In accordance with another aspect of the present invention, an electrically controlled fluid control valve includes a position measuring element for providing a measurement proportional to the position of the movable element, and an electrical controller governed by the position measurement to regulate current to the SMA drive element to position the movable element to a desired position. In one embodiment of this aspect, the position measuring element is integral to the valve actuator and comprises oppositely disposed conductive plates that are part of the valve actuator assembly and that form a capacitive element, the capacitance of which changing in proportion to the position of the movable element. The electrical controller includes means for sensing the capacitance of the capacitive element and converting it into an electrical signal representative of the position of the movable element.

In yet another aspect of the present invention, a temperature compensated, electrically controlled fluid control valve includes a temperature sensing means disposed in proximity to the SMA drive element to measure temperature and generate an electrical temperature signal representative thereof, cooling means for reducing the temperature surrounding the SMA drive element when activated, and a temperature controller governed by the electrical temperature signal to activate the cooling means. In one embodiment of this aspect, the cooling means may be selected from the group consisting of a rotary fan, a Piezo-fan cooling device and a Peltier cooling device. In another embodiment of this aspect, the temperature controller activates the cooling means as a function of the electrical temperature signal and a temperature setpoint.

In yet another aspect of the present invention, an electrically controlled fluid control valve includes a means for selecting a rate of heating the SMA drive element, and an electrical controller governed by the selecting means to regulate current to the SMA drive element. In one embodiment of this aspect, the electrical controller includes means for regulating current to the SMA drive element by pulse width modulation of the current. In another embodiment of this aspect, a digital selector switch is used for generating a digital code representative of the selected rate. In this embodiment, the electrical controller is a digital controller governed by the digital rate selection code to modulate the current to the SMA drive element.

In yet another aspect of the present invention, the electrical controller of the fluid control valve is governed by both the position measurement and the temperature signal to regulate current to the SMA drive element and to control the cooling means to position the movable element to a desired position. In one embodiment of this aspect, a first means is governed by the position measurement and a position setpoint to generate a temperature setpoint, and a second means is governed by the temperature signal and the temperature setpoint to regulate current to the SMA drive element and to control the cooling means to position the movable element to a position represented by the position setpoint. In another embodiment of this aspect, the second means regulates current to the SMA drive element based on a difference of the temperature setpoint and temperature signal of one plurality and controls the cooling means based on a difference of the temperature setpoint and temperature signal of the other polarity.

In yet another aspect of the present invention, a method for configurating a bobbin of non-conductive material wound with a multiplicity of SMA wire windings for a SMA driven valve actuator comprises the steps of removing groove sections from the bobbin for acceptance of the multiplicity of SMA wire windings, applying a conductive material to the surface area of the grooved sections, and winding the SMA wire windings onto the conductive grooved surfaces. In accordance with yet another aspect of the present invention, a method for preparing the SMA wire for an SMA driven valve actuator comprises the steps of coating the SMA wire surface with a conductive material, and winding the coated SMA wire around the at least one bobbin, and removing the conductive material from the surface of the SMA wire not in contact with the at least one bobbin.

BRIEF DESCRIPTION OF THE DRAWINGS

FIG. 8 is a functional block diagram schematic of another embodiment of the present invention.

FIG. 9 is a block diagram schematic of yet another embodiment of the present invention.

FIG. 9A is a graph illustrating suitable control ranges for the embodiment shown in FIG. 9.

DESCRIPTION OF THE PREFERRED EMBODIMENT

Figure 1:
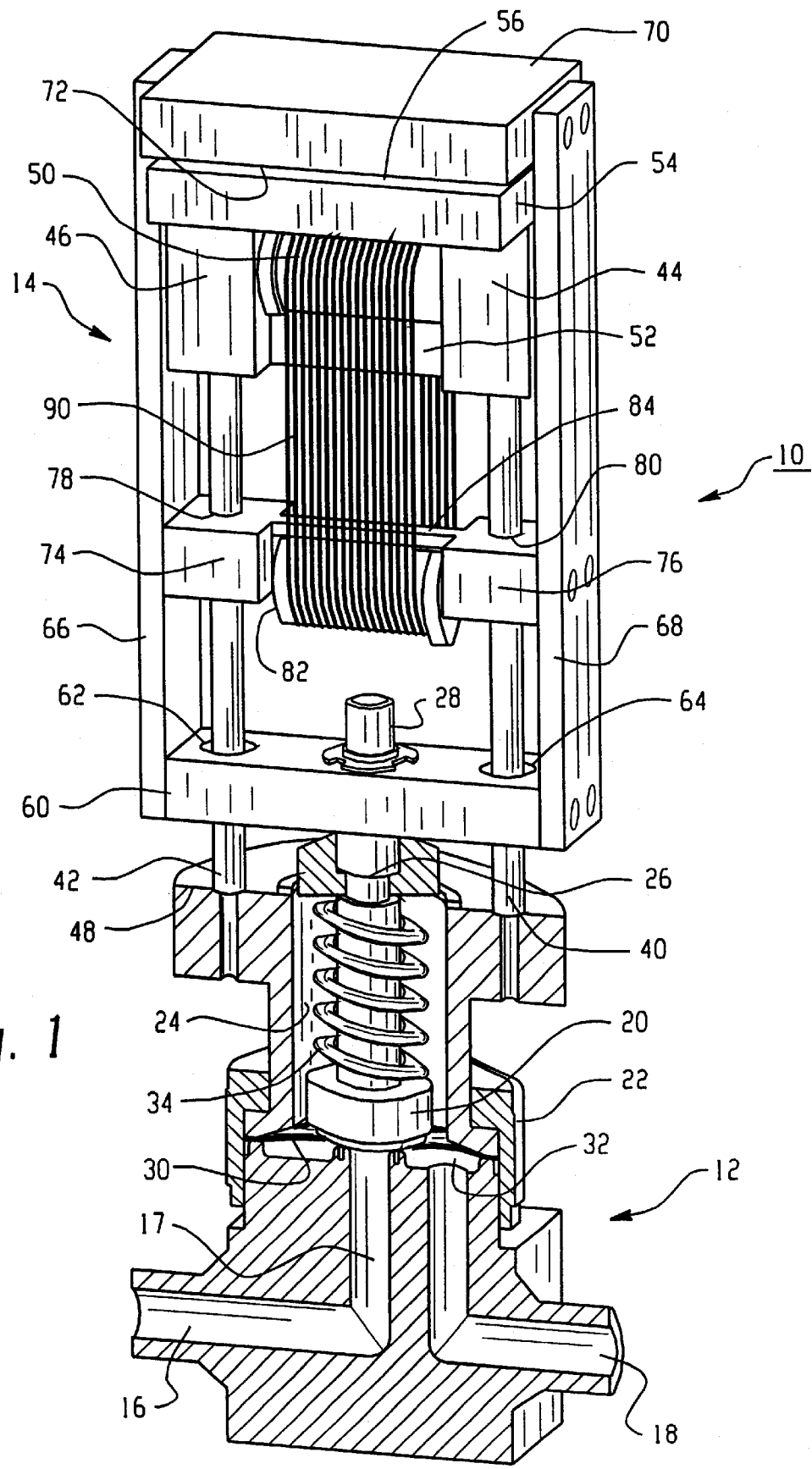
FIG. 1 is an isometric cross-sectional illustration of a fluid control valve having a shape memory alloy (SMA) driven actuator suitable for embodying the principles of the present invention.

In FIG. 1 is shown by an isometric cross-sectional illustration a fluid control valve 10 having a shape memory alloy (SMA) driven actuator. The fluid control valve 10 includes a valve body portion 12 and a valve actuator portion 14 external to the valve body and removable therefrom. The term "fluid" as used in this description is not be limited to fluids in the liquid state, but is also intended to include fluids in the gaseous state and combinations of fluids in the gaseous and liquid states. The valve body 12 being described below is of the diaphragm type and is only used by way of example. It is understood that any type of fluid valve may be used with the valve actuator portion 14 including, but not limited to, bellows valves, gate valves, needle valves, ball valves, and pinch valves, for example. It is understood that some modification may be desired for adaptation of the present embodiment to other type valves, like for rotational motion, for example, but any such modification is clearly within the ability of anyone skilled in the pertinent art given the description of the present embodiment. In addition, the term "control" should not be limited to vernier or variable control valves but also to "on-off" valves as well.

In the present embodiment, the valve body 12 includes an inlet port 16 and outlet port 18. Fluid is permitted to flow through the valve body 12 from the inlet port 16 to the outlet port 18 as controlled by the position of a movable element 20 which may be the valve stem, for example. The valve body 12 further includes a bonnet nut 22 having a cavity 24 longitudinally disposed therein. The valve stem 20 extends from an opening in the inlet port 16 at the orifice 17 thereof up through the cavity 24 and protrudes through the bonnet nut 22 at opening 26. A portion of the valve stem 20 extends beyond the bonnet nut 22 through the opening 26 to be attached to the valve actuator 14.

Still further, in the present embodiment, the valve body 12 includes a cavity area 32 which extends between the inlet port 16 and outlet port 18 to permit fluid to flow therethrough. and a diaphragm 30 which is disposed over and extends across the cavity 32. In this embodiment a valve spring 34 is disposed within the cavity 24 around the stem 20 to bias the stem with a mechanical force in the closed position. In particular, the bias spring 34 may rest on the valve stem 20 in the compression state forcing the valve stem 20 against the diaphragm 30 with a downward force to close off the flow of fluid from the inlet port 16. It is understood that while the spring 34 in the present embodiment biases the movable element 20 to a closed position it may in a similar manner bias the stem in an open position or some other position depending upon the valve type and particular application thereof without deviating from the principles of the present invention.

For this embodiment, the valve actuator 14 comprises a first or inner frame section made up of two metal guideposts 40 and 42 and two metal sections 44 and 46 supported at the top of the guideposts 40 and 42, respectively. The guideposts 40 and 42 are transversely and removably affixed to the flat top portion of the bonnet adapter 48 and spaced apart from one another. A bobbin 50 is disposed between the metal sections 44 and 46 of the fixed frame in a transverse alignment to the guideposts 40 and 42. An additional metal section 52 may be disposed between the sections 44 and 46 to support the bobbin 50 if structurally desired. On top of the sections 44 and 46 is supported a non-conductive member 54 having a substantially flat top surface 56. This inner frame section comprising the members 40, 42, 44, 46, 50, and 54 is fixed in relation to the valve body 12.

The valve actuator 14 also includes a second or outer frame section comprising a bottom metallic section 60 which is oriented substantially parallel to the flat surface of the bonnet adapter 48 and includes holes 62 and 64 to slide over the guideposts 42 and 40, respectively. The top of the valve stem 28 is affixed to the metal section 60 by a retaining clip and spring washer combination which permits the top of the stem 28 to protrude through the metal section 60 and be connected thereto. This outer frame section includes two additional metal sections 66 and 68 which are connected at the bottom to the section 60 on either side thereof and extend upwardly therefrom substantially parallel to the guideposts 40 and 42. Affixed between the metal sections 66 and 68 at the top thereof is a section of non-conductive material 70 having a substantially flat bottom surface oppositely disposed the surface 56 of the non-conductive portion 54. The members 60, 66, 68 and 70 of the outer frame section form a substantially rectangular frame section. At a predesigned location somewhere between the top and bottom of the metal sections 66 and 68 are attached two metal sections 74 and 76, respectively. The metal sections 74 and 76 include holes 78 and 80, respectively, for passing the guideposts 42 and 40, respectively, therethrough. Accordingly, this outer frame section is movable with respect to the valve body 12 and guided along its movement by the guideposts 40 and 42 utilizing the holes 64 and 62 in section 60 and 80 and 78 in sections 76 and 74, respectively.

Still further, the sections 74 and 76 are used to support a second bobbin member 82 therebetween in an orientation which is transverse to the guideposts 40 and 42. A further structural member 84 may be disposed between sections 74 and 76 to support the second bobbin member 82 if desired. While the various structural frame members have been described as metallic in the present embodiment, it is understood that these members may be constructed from other materials, like ceramic, plastic or any polymer, for example, or any combination thereof without deviating from the principles of the present invention.

In the present embodiment, the members of the frame sections of the valve actuator 14 may be affixed together using any conventional method like screws, rivets, or the like for ease in manufacturing. If it makes sense, these members may also be welded together in the manufacturing process. Moreover, in the present embodiment, the bobbins 50 and 82 may be cylindrical in shape and made of an insulating or non-conducting material, like polyphenylene sulphide, for example.

For this embodiment, the valve actuator 14 includes a multiplicity of SMA wire sections coupled between the outer and inner frame sections for moving the movable stem element 20 from its biased position to another position when heated. In the present embodiment the multiplicity of SMA wire sections comprise a single SMA wire wound a multiplicity of times about the two bobbin members 50 and 82. The bobbin members 50 and 82 may include grooves therein for accepting the SMA wire windings 90. In some embodiments, the grooved areas of the bobbin members 50 and 82 may include a coating of an electrically conductive material. A technique for providing the electrically conductive material onto the bobbins particularly in the grooved surface areas thereof is found supra.

The SMA wire used for the windings 90 in the present embodiment comprises a Nickel-Titanium alloy and has a diameter which is very small on the order of 0.015 inches, for example. The bobbins 50 and 82 are also relatively small in diameter to offer a ratio of the winding radius thereof to the diameter of the SMA wire that is substantially less than 50:1. In practice, this ratio will more than likely not be less than 5:1. Actually, the radii of the cylindrical bobbins 50 and 82 are on the order of 0.2 inches. The SMA wire is terminated at its ends which are mechanically inactive regions of the wire to provide a restraint to strain when the active portion of the wire is heated. In the present embodiment, these terminations are accomplished by disposing the wire ends through respective holes in the outer edges of the bobbin section, say 50, for example, and wedges are provided into the holes of the bobbin to wedge the wire end points in place to form a restraint to strain.

Under these conditions, the outer movable frame section is supported from the inner frame section by the multiplicity of SMA wire sections 90 wound about the bobbin sections 50 and 82 of the respective frame section. Since the outer frame section is connected to the movable stem element 20 via section 60, then the biasing of the stem 20 downward by the spring 34 forces the multiplicity of wire sections 90 to be extended when in the low temperature phase.

Figure 2:
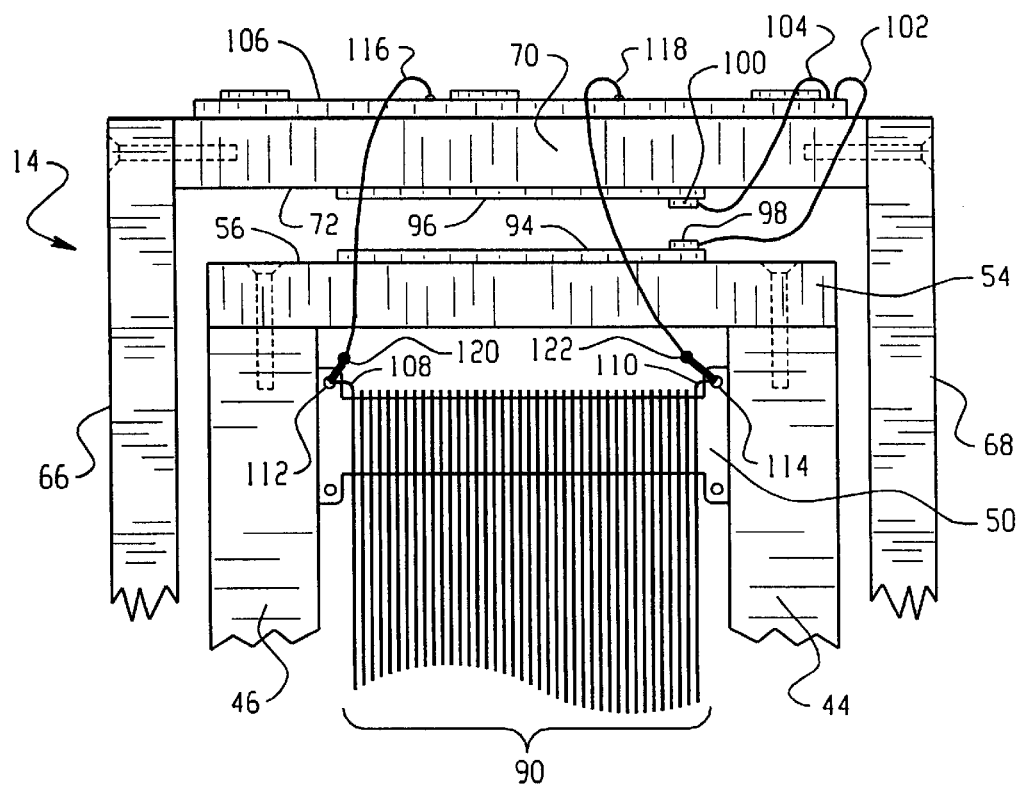
FIG. 2 is a cross-sectional illustration of the top portion of the valve actuator embodiment shown in FIG. 1 revealing greater detail thereof.

The top portion of the valve actuator 14 is shown in greater detail in the cross-sectional illustration of FIG. 2. Referring to FIG. 2, the substantially flat surfaces 56 and 72 of the non-conductive top portions 54 and 70, respectively, have conductive material 94 and 96 disposed respectively thereon such that they form conductive plates which are oppositely disposed from one another and insulated from their respective frame sections to form an integral capacitive element within the valve actuator assembly 14. Contacts 98 and 100 at the conductive plates 94 and 96, respectively, permit attachment of wire leads 102 and 104, respectively, which are coupled to position measuring electronics on a printed circuit board 106 which may be mounted on top of the non-conductive section 70 as shown in FIG. 2. The electronics of the printed circuit board 106 will become better understood from the description found hereinbelow.

In addition, the terminated ends 108 and 110 of the SMA wire winding 90 are shown attached through respective holes at either end of the bobbin 50. As described above, the ends 108 and 110 are terminated by wedging a metallic conductive member into the holes 112 and 114. The SMA wire endings along with the metallic conductive wedges may exit the holes 112 and 114 and be attached to wire leads 116 and 118, respectively, at the points 120 and 122. These connections at 120 and 122 are preferably performed by crimping using a conventional crimping tool. But it is understood that other ways of attaching the connecting leads 116 and 118 may be used such as soldering, welding, brazing, and wrapping, for example. The leads 116 and 118 connected to the ends of the SMA wire winding are provided to input connecting pads on the printed circuit board 106 to provide heating of the SMA wire sections 90 by regulating current therethrough as will become more apparent from the description hereinbelow. In some applications, the printed circuit board 106 may be made from a flexible membrane printed circuit board.

The SMA wire used for the present embodiment is a nickel titanium alloy with a 50-50 percent ratio based on atomic number. A suitable SMA wire for this purpose is manufactured by Dynalloy, Inc. under the trade name Flexinol™. On the other hand, it is understood that there are many types and alloy mixtures of shape memory alloy wires that may be used in the present embodiment without deviating from the broad principles of the present invention. Since a very thin diameter wire on the order of 0.015 inches is being used for the present embodiment, only a relatively small amount of current is needed to heat the wire to reach its transformation temperature which may be on the order of 70° C. to 90° C. When the wire reaches this temperature, it undergoes a phase change from the low temperature phase to the high temperature phase wherein it begins a contraction of its length. In addition to using a relatively small amount of current, the thin diameter SMA wire is much more manageable for thermodynamic and manufacturing purposes.

Accordingly, the multiplicity of windings about the bobbin sections in the present embodiment mechanically act as a multiplicity of single wire sections coupled between the two frame sections and the force gained by each wire section is additive. Therefore, the resulting embodiment provides for both a mechanical advantage and an electrical advantage of having one long, thin wire. In addition, those portions of the SMA wire contiguous with the bobbin sections offer no real mechanical advantage and therefore are mechanically inactive upon the heating thereof because of the orientation of the force factors. Therefore, it would be preferable to remove them from the electrical circuit as well, and this may be accomplished by plating the grooved sections of the bobbin elements to allow an electrical path which bypasses the thin wire winding in each case.

In operation, the embodiment described in connection with FIGS. 1 and 2 provides for heating of the SMA wire windings 90 by regulating current therethrough using the electronics of the printed circuit board 106, which will be further explained hereinbelow. As the SMA wire windings are heated through its transformation temperature, the SMA wire changes phase from the low temperature phase to the high temperature phase and begins a contraction of length at a rate that is a function of the current regulated therethrough. As contraction begins, the outer frame member of the valve actuator 14 which is supported by the SMA wire windings by bobbin 82 begins moving away from the valve body pulling the stem or movable element 20 along with it overcoming the force of the spring 34. In so doing, the valve stem 20 is unseated and allows the diaphragm to move above the cavity 32 and permit fluid to flow from the inlet port 16 to the outlet port 18 via cavity 32 in the valve body 12. This movement will continue at a rate controlled by the current conducted through the SMA wire windings 90 until the valve stem 20 reaches a full open position.

During this movement, the conductive plates 94 and 96 of the integrally formed capacitive element between the outer and inner frames of the valve actuator 14 move apart from one another, thus causing a change in capacitance, which is detected by the printed circuit board 106 through a position control circuit, which will be further described hereinbelow. Current may continue to be regulated through the SMA wire windings to maintain the movable element 20 in an open position. Once current is removed from the wire windings 90, the windings begin to cool through the transformation temperature, and as they reach the low temperature phase, begin to expand in length as a result of the tension thereon caused by the bias element 34. Accordingly, the bias element 34 will continue to force the wire windings to extend and force the moving element 20 to seat on the diaphragm 30, thus closing off the fluid flow from the inlet port 16 to the outlet port 18 of the valve body 12. This process will be repeated each time the valve is demanded to be opened and closed.

Figure 3:
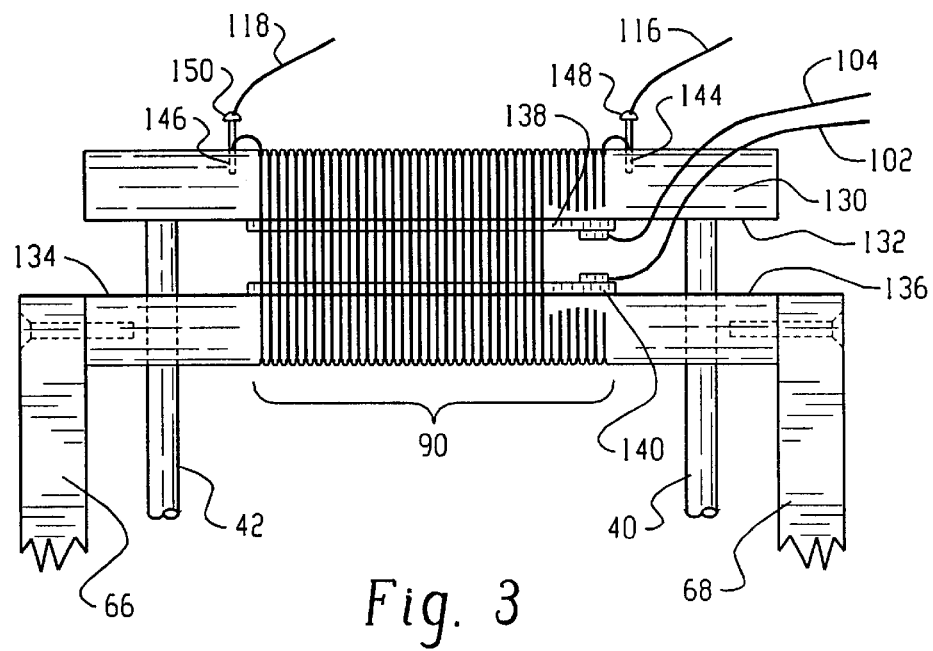
FIG. 3 is a cross-sectional illustration of the top portion of an alternate embodiment of the valve actuator shown in FIG. 1.
Figure 4:
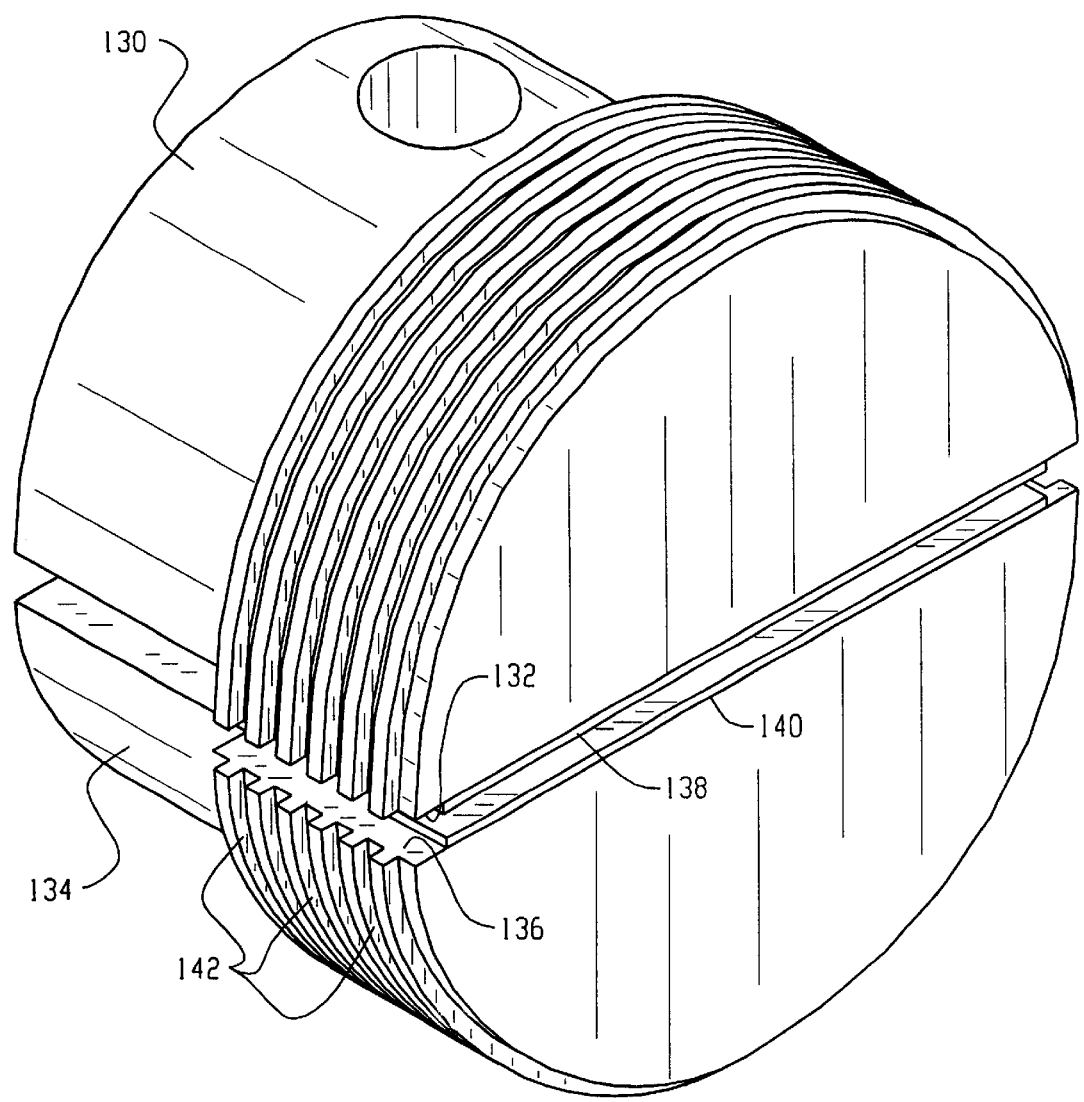
FIG. 4 is a cut away isometric view of bobbin sections of the alternate embodiment of FIG. 3.

In FIGS. 3 and 4 is shown an alternate embodiment in which the second frame section is guided through its movement along the inside of the first or fixed frame section. Referring to FIG. 3, a bobbin element 130 is disposed on top of the two metal guideposts 44 and 46 and affixed in place. This bobbin element 130 is curved on top to accept the SMA wire windings 90, but has a substantially flat bottom surface 132. A second bobbin element 134 is disposed on top and between the longitudinal metal frame members 66 and 68 of the second frame section. The bobbin element 134 is curved on the bottom to accept the SMA wire windings 90, but has a substantially flat top surface area 136 which is oppositely disposed from the surface 132. Surface areas 132 and 136 have disposed thereon conductive material 138 and 140, respectively, to form the plates of a capacitor separated by air. The capacitor element is integral to the actuator assembly.

Still in FIG. 3, SMA wire is wound a multiplicity of times about the bobbins 130 and 134, preferably into grooves 142 cut into the curved surfaces thereof. FIG. 4 illustrates by cut away view the two bobbins 130 and 134 and the grooves 142 cut from the curved surfaces thereof. FIG. 4 also reveals the conductive plates 138 and 140 forming the integral capacitive element of this embodiment of the actuator 14. Returning to FIG. 3, the ends of the SMA wire windings are terminated into holes disposed on the top surface of the bobbin 130. Metal contacts 148 and 150 wedge the wire ends into the holes 144 and 146, respectively, while at the same time, making an electrical connection thereto. Lead wires 116 and 118 may be connected to the metal connectors 148 and 150, respectively.

This alternate embodiment operates in a similar manner as the embodiment described in connection with FIGS. 1 and 2, except that the second frame section is guided through its movement along the inside of the first or fixed frame section, i.e. the bobbin of the fixed frame section is external to the second or movable frame section.

Figure 5A:
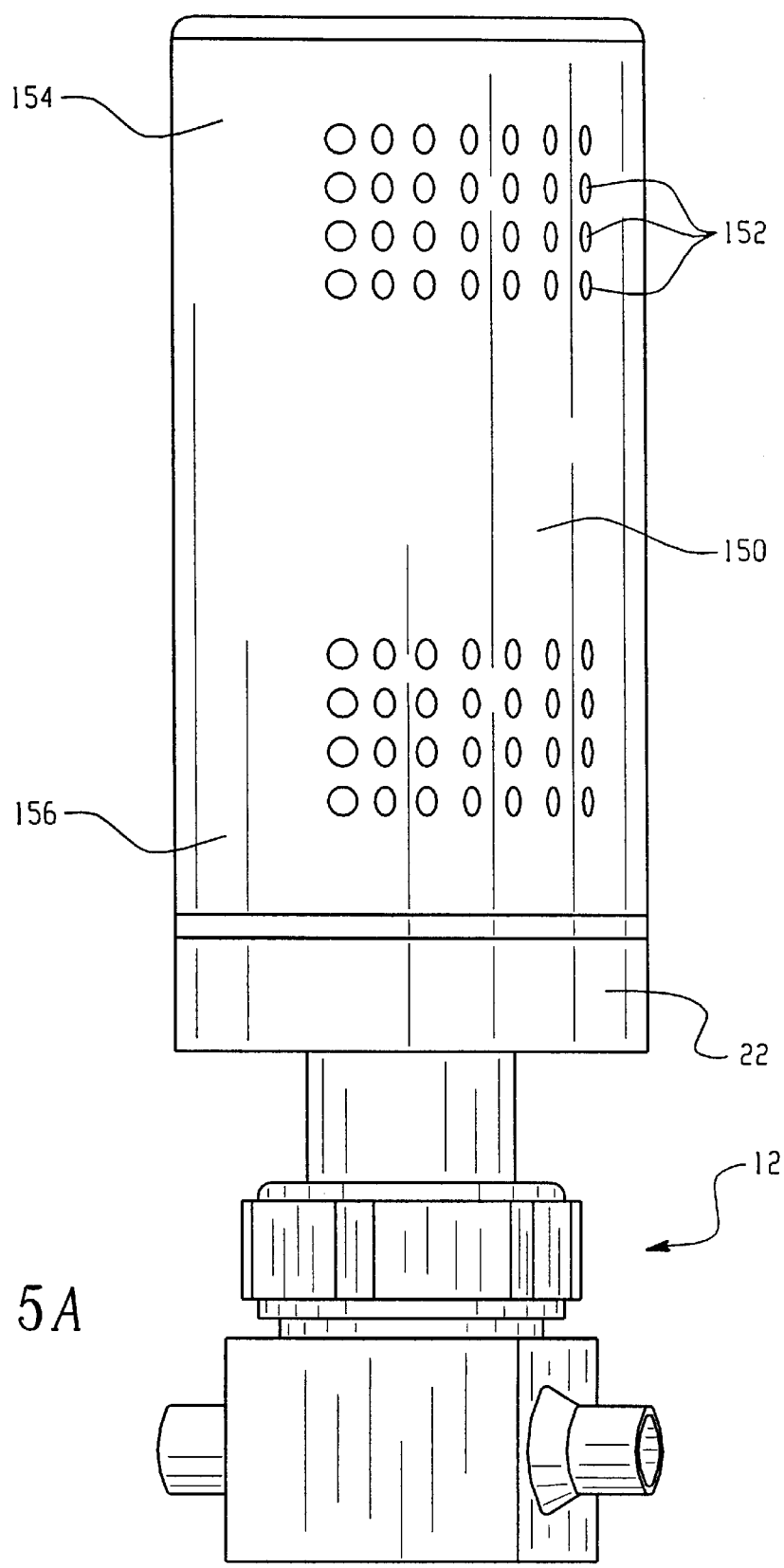
FIG. 5A is an illustration of the embodiment of FIG. 1 showing a vented housing surrounding the valve actuator thereof.
Figure 5B:
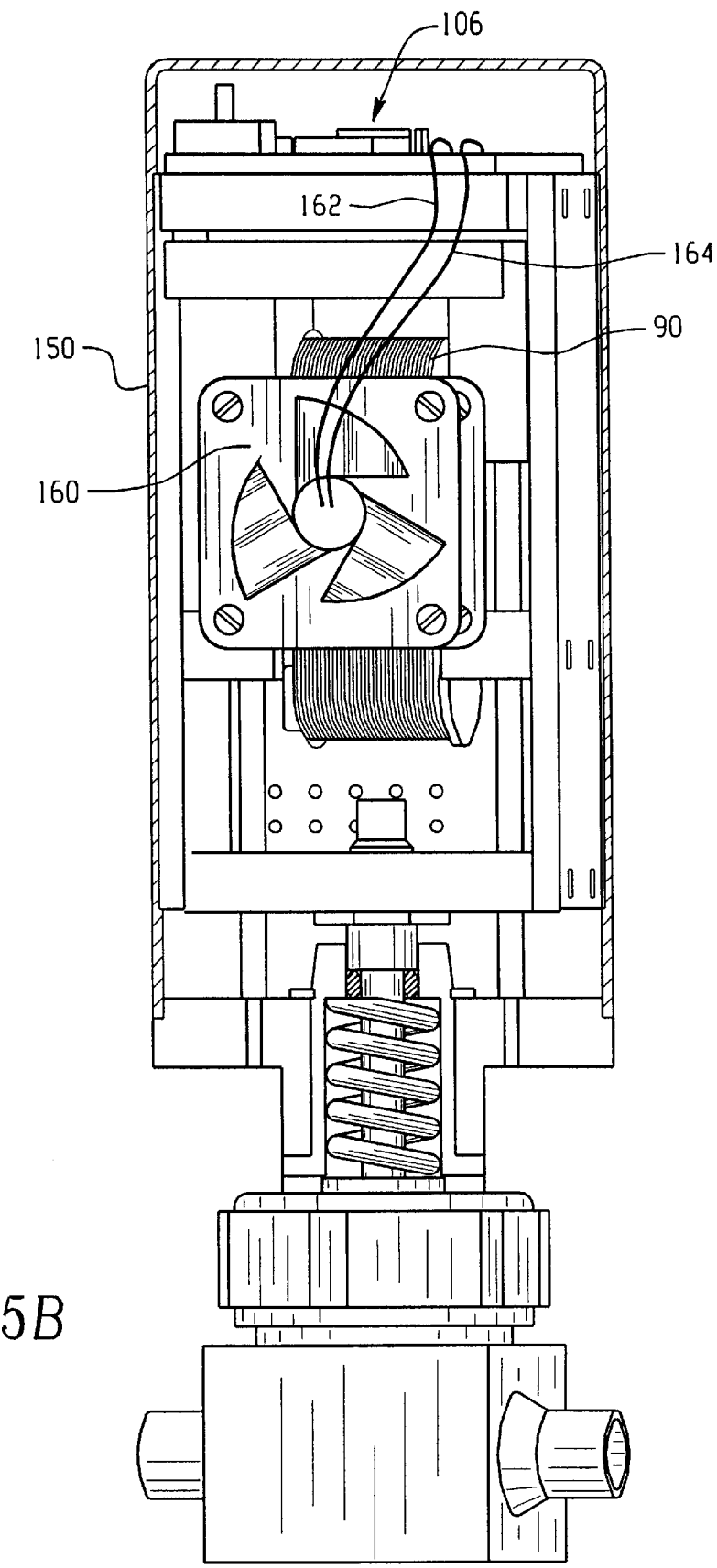
FIG. 5B is an illustration of the embodiment of FIG. 1 with the housing portion thereof cut away and showing a cooling fan assembly.

In FIGS. 5A and 5B is shown a valve actuator cover or housing 150 that may be added to the valve assembly 10 to protect the actuator assembly and electronics from the adverse elements of the external environment. In the present embodiment, the housing 150 may be of a cylindrical shape for fitting over and enclosing the valve actuator 14 and attaching to the periphery of the bonnet nut 22 of the valve body 12. To permit air to flow through the inside of the housing 150, openings 152 are provided, preferably at the top 154 and bottom 156 portions thereof. Hot air generated within the housing primarily from the heating of the SMA wire sections may flow upward and exit through the openings 152 at the top portion 154 of the housing. Cooler outside air may be drawn into the enclosure from the openings at the bottom portion 156. This natural convective air flow will aid in cooling the inside of the enclosure during operation of the valve actuator 14.

While the housing 150 is shown cylindrical it is understood that the housing may take upon any shape so long as it can fit over and enclose the actuator assembly 14 and be capable of attaching to the valve body 12. In addition, the air flow openings 152 may take upon any shape, like holes, slots and the like, so long as the openings accommodate sufficient air flow through the housing 150.

In some environments, it may be desirable to add a cooling device to the assembly 10 to maintain the temperature of the air surrounding the SMA wire sections 90 below a preset temperature and/or to cool the wire to ensure a desired rate of closure of the movable element 20. Such a cooling device may be of the type that forces air about the wire sections 90 to maintain the surrounding air at a temperature at or below the preset temperature and/or to cool the wire at the desired rate. A cooling device of this type may be selected from the group consisting of a rotary fan and a Piezo-fan, for example. The cooling device may be disposed at the housing 150 or on the actuator assembly 14 within the housing for forcing air to flow through the housing openings 152 and around the SMA wire sections 90. Thus, when activated the cooling device would be capable of reducing the temperature inside the housing 150 and to allow the wire to cool at the desired rate.

In some environments, it may be preferable to eliminate the openings and maintain the housing closed from the environment. In these cases, a solid-state refrigerating device, like a Peltier cooling device, for example, may be used as an alternative to forced air cooling, if desired.

In the present embodiment, a conventional rotary fan 160 may be mounted on an internal wall of the housing 150 as shown in the cut away illustration of FIG. 5B. The fan 160 may be disposed in close proximity to the SMA wire sections 90 to force air across the windings and cool the temperature of the wire and surrounding air thereof. Wire leads 162 and 164 may connect the motor of the fan 160 to a temperature controller on the PC board 106. The temperature control of the wires 90 and air surrounding them utilizing the cooling device 160 will be described in greater detail hereinbelow.

Figure 6:
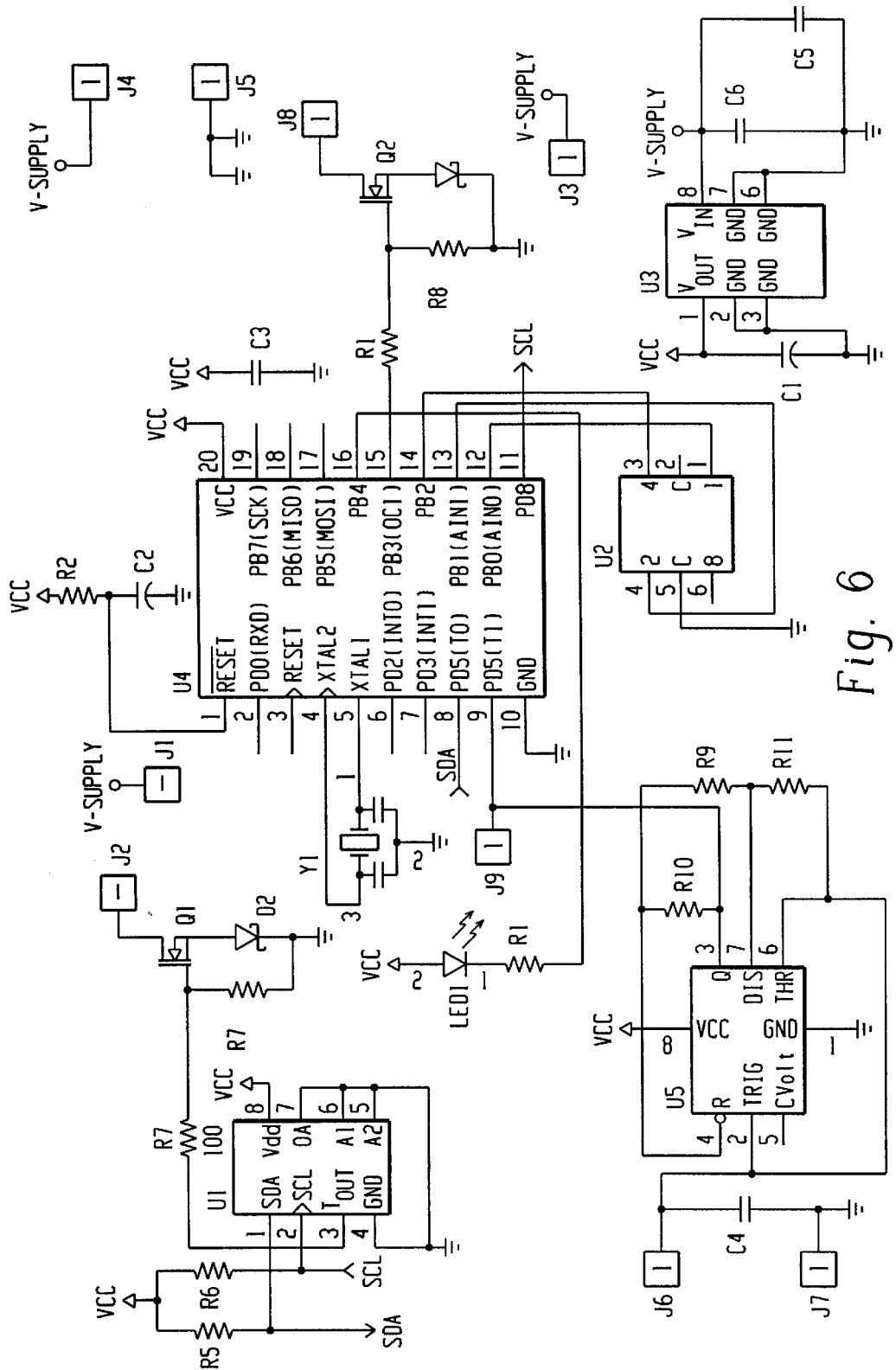
FIG. 6 is a circuit schematic of an electrical controller suitable for embodying an electrical control of the fluid control valve embodiment of FIG. 1.

A suitable embodiment of the control electronics of the PC board 106 for the valve actuator of the present embodiment is shown schematically in FIG. 6. Referring to FIG. 6, the circuits of the PC board 106 comprise a two-wire digital thermometer and thermostat integrated circuit shown at U1, which may be of the type manufactured by Dallas Semiconductor under the Model No. DS1721S; a binary coded rotary DIP switch U2, which may be of the type manufactured by Grayhill Incorporated under the Model No. 94HAB10; a three-terminal positive voltage regulator integrated circuit U3, which may be of the type manufactured by National Semiconductor under the Model No. LM78L05ACM; a microcontroller U4, which may be of the type manufactured by Atmel, Inc. under the Model No. AT90S2313-4SI; a timer integrated circuit U5, which may be of the type manufactured by Phillips Semiconductor under the Model No. NE555, two power MOSFET semiconductor switches Q1 and Q2, which may be of the type manufactured by International Rectifier under the Model No. IRLR/U024N; and finally, two Schottky barrier rectifiers D1 and D2, which may also be of the type manufactured by International Rectifier under the Model No. B130/B, for example. The printed circuit board 106 may also include a number of input/output connections J1–J8 for inputting power from a power source, inputting signals for measurement and outputting signals for control of the heating of the SMA wire 90 and the cooling device 160.

Outside power from a power source may be connected to the connection points J4 and J5, J4 being the supply and J5 being the return. The output power may be from a direct current voltage source of say 9 to 12 volts, for example. The integrated circuit U3, which is a series pass, step down voltage regulator regulates the higher supply direct current (DC) voltage, supplied from the input connector J4, down to 5 volts DC, which is supplied to the other integrated circuits U1, U4 and U5 included on the printed circuit board. The coupled capacitors to the integrated circuit U3, C1, C5 and C6, protect U3 from voltage transients which may be induced on the power source supply line and assists the regulator to supply substantially a constant 5 volt voltage level to the remaining circuitry on the printed circuit board. All returns from the various integrated circuits are connected to the return connector J5. The substantially constant 5 volt supply is designated as Vcc.

Connection points J6 and J7 are connected to the capacitive plates via the lead wires 116 and 18 for monitoring the capacitance of the integral capacitive element through the integrated circuit U5. The 555 integrated timer circuit U5, utilizing the integral capacitor and appropriate valued resistors R9, R10 and R11, is configured conventionally as a variable oscillator circuit which generates an electrical frequency signal at pin 3 thereof. The frequency of the output electrical signal at pin 3 of U5 varies in proportion to the external capacitance that is a measure of the position of the movable element of the valve body. The capacitor C4 across connectors J6 and J7 is used for trimming the external capacitance.

In operation, as the movable element of the valve moves away from its closed position, the plates of the integral capacitive element move further apart or together, depending on the embodiment, and the capacitance thereof changes accordingly. This change in capacitance is picked up at the connectors J6 and J7 and applied to the integrated circuit U5 at pins 2 and 6. The resistors R9 and R11 and external integral capacitance make up an RC time constant to the 555 timer circuit U5 which, in turn, renders the output frequency signal at pin 3 thereof. Accordingly, as the position/capacitance changes, the RC time constant changes, and the output frequency varies in proportion thereto. The output frequency signal is coupled to an input pin, pin 9, of the microcontroller U4. This frequency signal provides an electrical signal representative of the position of the movable element of the valve body 12.

Since the printed circuit board 106 is disposed on the valve actuator in proximity to the SMA wire section 90, the ambient temperature surrounding these wire sections may be measured by a temperature sensor disposed on the printed circuit board. This is accomplished in the present embodiment by the integrated circuit U1, which includes internally a temperature sensing element and digital electronics for converting the temperature measurement into a digital code which is serially output therefrom at pin 1, designated as the SDA signal, and coupled to pin 8 of the microcontroller U4, which is configured as an input data pin. In addition, a serial digital code, SCL, may be sent to pin 2 of the integrated circuit U1 from pin 11 of the microcontroller, which is configured as a digital output. Pull-up resistors R5 and R6, which may be of the value 20 KΩ, couple the signal lines SDA and SCL to the Vcc supply. Accordingly, serial data representing a temperature setting may be provided by the microcontroller U4 over SCL to the integrated circuit U1. This temperature setting or set point may be used by the circuit U1 to compare with the digital code of the temperature measurement internally provided. The microcontroller U4 may also send a serial code over SCL to U1 at pin 2 to control the rate in which the temperature data is sent back to the microcontroller from pin 1 of U1.

The circuit U1 is configured to measure the current temperature and compare it to the temperature setpoint level controlled by the microcontroller U4 via SCL. When the current temperature measurement of U1 reaches the predetermined temperature setpoint, the circuit U1 outputs a signal over pin 3 to turn the MOSFET switch Q1 on. Power from the external supply is provided to the cooling fan 160 or other cooling device via lead wire 162 from the connector J1. The cooling device return path is provided through connector J2 via lead wire 164 to the input of Q1. The output of Q1 is coupled to ground through the Schottky barrier rectifier D2, which is used to protect the MOSFET Q1 from reverse voltages. When the switch Q1 is turned on by U1, power from the external supply is provided to the cooling device 160 to cool the ambient air surrounding the SMA wire sections 90 of the valve actuator 14.

In this manner, the circuits U1, Q1 and D2 and cooling device 160 form a temperature control loop for the ambient air surrounding the SMA wire sections 90 such that when the ambient temperature thereat reaches the setpoint programmed into the temperature controller U1 by the microcontroller U4, the cooling device is activated to reduce the temperature back down to the temperature setpoint or thereunder if hysteresis is provided.

In the present embodiment, a selector switch U2 is used to accommodate a selection of heating rates of the SMA wire sections 90. Digital outputs from the binary coded rotary DIP switch U2 are provided to corresponding input configured ports of the microcontroller U4. The particular DIP switch being used for the present embodiment has eight positions and outputs a binary coded decimal signal over its pins 1, 4, and 3. Pin 5 is coupled to the ground connection and pin 6 is left unconnected. The microcontroller U4 monitors the binary coded signals of pins 1,4 and 3 through the input pins 12, 13 and 14, respectively. Accordingly, a plurality of different heat ramping profiles for the SMA wire sections and movement of the movable element may be selected from the selector switch U2.

The microcontroller U4 is programmed through embedded software to perform logical steps in a timely fashion. It monitors its inputs and controls the outputs thereof according to preprogrammed logical instructions embedded in digital code in the memory thereof. Y1 is a 4 megahertz ceramic resonator which provides the microcontroller with a clocking signal through pins 4 and 5 thereof. A connection from the series combination of R2 and C2 provide a reset signal at pin 1 of the microcontroller U4 each time the supply voltage to the PC board 106 is activated. When the supply voltage is removed, the PC board electronics are deactivated. Thus, in one embodiment, the supply voltage to the PC board 106 may be used to operate the movable element of the valve assembly 10 to its open and closed positions. Capacitor C3 is used to protect the microcontroller U4 against transient voltages and is disposed close to the circuit U4 between the supply Vcc and ground.

In addition, output pin 15 of the microcontroller U4 is coupled to the gate of the MOSFET switch Q2 through the resistor R3 for switching Q2 on and off, and the gate of Q2 is coupled to ground through the resistor R8. The output connectors of the printed circuit board J3 and J8 are connected to the two ends of the SMA wire winding 90. The external voltage supply is conducted through connector J3 to one end of the wire winding 90 via connector J3, and the return from the other end is connected to connector J8. A current conduction path from J8 to ground is provided through the MOSFET switch Q2 when activated. The Schottky barrier rectifier D1 provided in series to the conduction path to ground protects the MOSFET switch Q2 against adverse voltage transients over the external supply line. In the present embodiment, the microcontroller U4 regulates the current through the SMA wire sections by switching Q2 on and off using a pulse width modulated signal, the pulse being varied according to the selected heating or ramp rate based on the code of U2.

Thus, in operation, when the printed circuit board 106 is supplied with a direct current voltage from 9 to 16 volts, for example, the SMA wire is supplied with a pulse width modulated voltage via the microcontroller U4 and switch Q2 based on the selected heat rate code of U2. In turn, the SMA wire contracts at a certain rate according to the selected heating rate of the wire, which is regulated by the pulse width modulated current drive. That is, as the current is varied through the wire, the temperature of the wire also varies. The duty cycle of the pulse width modulated current signal to the SMA wire will cause it to contract at a certain prespecified rate.

Pulse width modulation of the current to the SMA wire of the actuator is used because it is considered a more efficient way to vary the current through the wire than varying the voltage level to the wire. However, it is well understood that similar regulation of current through the SMA wire can be accomplished through pulse rate modulation or other modulation techniques. In addition, modulation can also occur by varying the voltage level to the wire using similar modulation techniques. Accordingly, all of these techniques are considered equivalent regulation of the heating of the wire to obtain a specified contraction rate to control the rate at which the movable element is positioned away from its closed position. Therefore, the circuitry described in connection with the embodiment of FIG. 6 is suitable for regulating current to the SMA wire windings to heat the wire windings and cause them to contract at a preselected ramping or contraction rate. An light emitting diode (LED) indicator may be controlled by the microcontroller U4 to show or be illuminated when the valve has fully opened, i.e., the movable element has reached its maximum movement away from a closed position.

Figure 7:
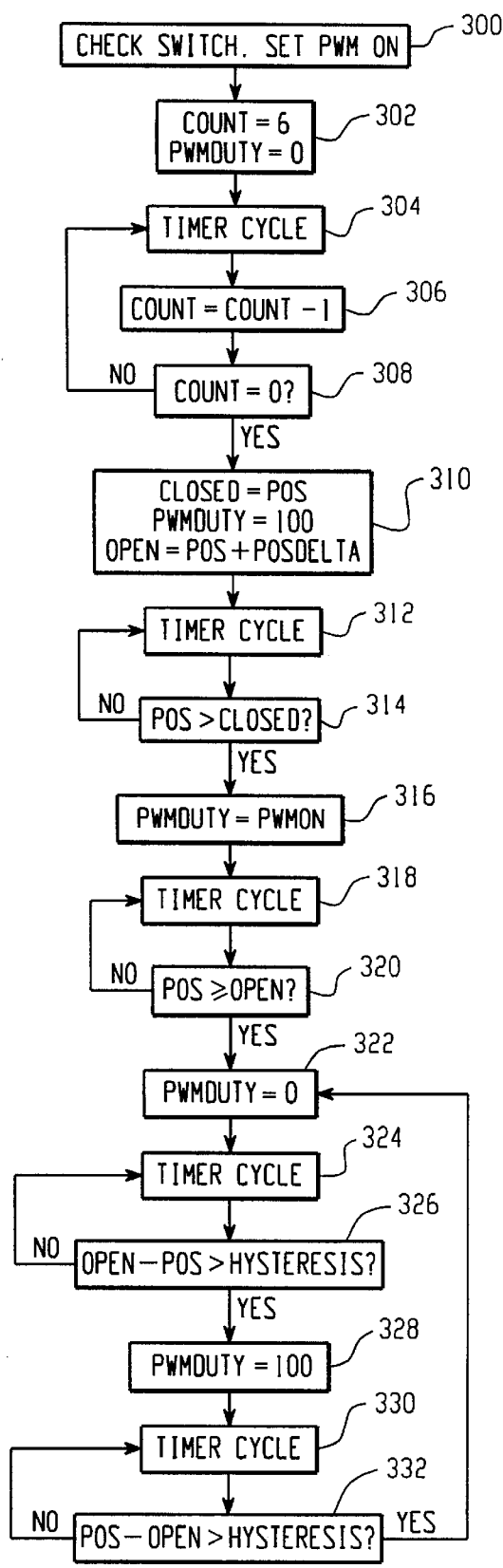
FIG. 7 is an exemplary flow chart suitable for use in programming the electrical controller of FIG. 6.

A flow chart suitable for use in programming the microcontroller U4 of the circuit embodiment described in connection with FIG. 6 is shown in FIG. 7. For the present embodiment, the microcontroller U4 has a system clock rate of approximately four megahertz and includes a timer cycle consisting of 256 counts of the system clock. Accordingly, each timer cycle takes approximately 16.4 milliseconds. Starting the flow chart at block 300 upon power turn on, the microcontroller is instructed to monitor the digital code from the selector switch U2 over digital input lines 12, 13 and 14. This digital code which sets the contraction rate of the SMA wire is stored in a data register labeled as PWMON. The data code in PWMON will be used to control the duty cycle of the pulse width modulated waveform controlling the current regulation to the SMA wire windings. In the next block 302, a digital code of 6 is stored in a data register labeled as COUNT, and the data register controlling the PWM duty cycle is set to zero. The next three instructional blocks 304, 306 and 308 provide the programming for the microcontroller to go through a counting cycle which is essentially a delay time of approximately 100 milliseconds to allow the circuitry on the printed circuit board to settle after power turn on. More specifically, in block 304 the timer counter is cycling through its 256 counts. Each time it makes a complete cycle, the number in the COUNT register is decremented by one in block 306. When the count in the COUNT register is decremented to zero as determined in 308, the time delay is complete and programming execution continues at block 310.

The data code in a data register designated as POS is the frequency monitored over pin 9 from the timer circuit U5, which is a measure of the position of the movable element in the valve body. Since we know that at power turn on the movable element is biased in the closed position, the initial POS data is stored in a data register labeled as CLOSED at block 310. Also in block 310, since it is advantageous to heat the SMA wire at a constant high rate to initiate movement of the movable element away from its static closed position, the PWMDUTY register used to regulate current to the SMA wire is set to full duty. Next in block 310, a full open position code is established by adding the difference in frequency derived counts, designated as POS delta, between the closed position and full open position of the movable element, to the initial closed position POS reading and storing that result, POS+POS delta, in a data register designated as OPEN.

Next, in block 312, with the SMA wire being heated at full duty cycle, the 256 count timer of the microcontroller counts through its cycle which defines a fixed time interval by which to count up the counts of the frequency signal being monitored at pin 9 from the position timer circuit U5 and monitor the current position of the movable element. Accordingly, the accumulated counts over the time interval of a timer cycle become the new position code that is stored in the data register POS. Therefore, in block 314, the new position code POS is compared with the code in the CLOSED register, i.e. the closed position, and if not greater, a new position count or code for POS is determined in block 312. Once the current POS code is greater than the code in the CLOSED register, the 312, 314 loop is exited and instruction execution continued at block 316. When block 314 is exited, we know that the SMA wire sections are heated to the transformation point and the wire is beginning to contract because the movable element is positioned away from its closed position. Therefore, in block 316, it is time to set the duty cycle of the pulse width modulation PWM-DUTY to the code of the preselected rate from U2 which was stored in PWMON.

While the wire is being heated at the selected current regulated duty cycle, the microcontroller goes through the loop of blocks 318 and 320. Again, in block 318 the timer cycle is going through its 256 count interval, which is the fixed interval in which to acquire the counts of the frequency signal from the position timer U5, which is representative of the new position POS of the movable element. In block 320, it is determined whether the new position is greater than or equal to the full open position, i.e. the code in the OPEN register. If not, the loop continues until the current position code POS is greater than or equal to the full open position OPEN whereupon block 320 is exited to block 322. In the instruction blocks 322 through 332, the microcontroller is in the mode to sustain the movable element within a deadband about the full open position. The deadband is defined by a predetermined code stored in a register designated as HYSTERESIS in the flow chart.

So, in block 322, the duty cycle register PWMDUTY is set to zero interrupting current to the SMA wire windings, thus allowing the wire to cool slightly. Within the timer cycle block 324, the current position POS of the movable element is determined, and in block 326, that current position POS is subtracted from OPEN and the result is compared with deadband value in the register HYSTERESIS. The blocks 324 and 326 are cycled until the current position falls below the deadband value, i.e. OPEN–POS is greater than HYSTERESIS. When this condition occurs as determined by block 326, the duty cycle register PWMDUTY is set to 100 percent in block 328 to initiate heating the SMA wire winding at the highest rate. Thereafter, in blocks 330 and 332, it is determined if the current position POS of the movable element has reached the deadband code beyond the full open position, i.e. POS–OPEN is greater than HYSTERESIS. When this condition occurs, the instruction execution is returned to block 322 wherein current is removed from the SMA wire winding, and it is allowed to cool. Execution will continue cycling through steps 322 to 332 for as long as power is applied to the circuitry. When power is removed to the circuitry of the PC board 106, no current is supplied to the SMA wire windings, and they are allowed to cool under tension of the bias element and return to their extended length, thus returning the movable element to its biased, closed position. In this manner, the valve can be electrically operated to turn on and off the fluid flowing through the valve 12 at any specified ramping rate.

FIG. 8 is a functional block diagram of an embodiment of yet another aspect of the present invention in which the movable element of the valve may be positioned to a desired position other than merely the full open position. The electronic embodiment described in connection with FIG. 6 and the flowchart of FIG. 7 may both be used by way of example with the embodiment of FIG. 8, albeit modified to accommodate the desired position control aspects. Referring to FIG. 8, a position set point 200 may be input to a rate of change algorithm 202 which may be similar to that described in connection with the flowchart of FIG. 7, for example. The position set point may be a digitally coded word selected by a digital switch (not shown) similar to that described for the switch U2 which is used in the circuit embodiment of FIG. 6 to set the heating rate or it may be generated by a process control computer (not shown) external to the valve actuator electronics. This digitally coded set point may be input to the microcontroller U4 through digital lines thereof characterized as inputs. For example, a 3 bit code would provide for 8 possible desired positions, a 4 bit code would provide for 16 possible desired positions, and so on. The microcontroller U4 may detect when a new position set point 200 is input thereto and store the code thereof in a register NEWPOS. The current position sensed from a position sensor 204 may be computed in a similar manner as that described for the flowchart of FIG. 7 and stored in the register POS. The position sensor 204 may be integral to the valve actuator as described in connection with the embodiments of FIGS. 1–4 or a separate sensor therefrom.

In this position control aspect of the present invention, the current position POS may be subtracted from the desired position setting NEWPOS in an adder function 206 resulting in an error 208 which is operated on by a position control function 210. The control function 210 may be an "on-off" discrete control that may cause the valve actuator to move to the desired position setting at the selected rate PWMON as described in blocks 316, 318 and 320 for the flowchart of FIG. 7 except that the NEWPOS register would be substituted for the OPEN register. In this example, the controller 210 controls a PWM current drive function 212 by setting the PWMDUTY register to the PWMON value. Accordingly, the SMA wire 90 of the valve actuator is heated with the constant duty cycle as governed by the selected heating rate PWMON. This process will continue until POS becomes equal to or greater than NEWPOS as determined by block 320 at which time the duty cycle PWMDUTY is set to zero in block 320 rendering no further heating of the SMA wire 90. Blocks 322 through 332 may be executed to maintain the valve element at the desired set point position NEWPOS, i.e. substitute NEWPOS for OPEN.

For this control strategy, should the desired position set point 200 be less the current position POS then the duty cycle PWMDUTY in the driver 212 is set to zero to permit the SMA wire to cool and extend to a new position. As the wire cools and POS reaches the desired position NEWPOS, then the blocks 322 through 332 may be re-executed to maintain the desired position setting.

It is understood that other control strategies may be used for the position controller 210 of the embodiment of FIG. 8 without deviating from the broad principles of the present invention. Some examples of other suitable position control strategies include Proportional (P), Proportional plus Integral (PI), Proportional plus Integral plus Differential (PID), Fuzzy Logic, Neural Network, and Rules based on Non-linear control, to name just a few. With these control strategies, the output of the controller 210 would control the rate of heating of the wire 90. If pulse width modulation of current was used, then the duty cycle of the current waveform would be set by the controller 210 in the driver function 212 which may be limited by a selected heating rate if so desired.

Another aspect of the present invention provides for temperature control as part of the positioning of the movable element of the valve to a desired position as described in connection with the embodiment of FIG. 8. A suitable embodiment for this aspect is shown in the functional block diagram schematic of FIG. 9, the functions of which being performed at least in part for the present embodiment in the microcontroller U4. Referring to FIG. 9, similar to that described above, the sensed position from the sensor 204 is subtracted from the position set point or desired position 200 in the adder 206 to produce the position error 208. To provide for thermal compensation in this embodiment, the position error 208 is converted into a temperature set point 220 by a position to temperature converter function 222 which may be based on the characteristics of the valve type and SMA drive of the actuator.

Still in FIG. 9, a temperature sensor 224, which may be similar to the U1 circuit described in the circuit embodiment of FIG. 6, senses the temperature in the proximity of the SMA actuator drive and generates a signal 226 representative thereof. The SDA signal generated by the circuit U1 exemplifies a temperature signal suitable for use by the microcontroller U4 in the present embodiment. The sensed temperature signal 226 is subtracted from the temperature set point 220 in the adder function 228 resulting in a temperature error signal 230 that drives a split range temperature control function 232. A suitable functional characterization of the controller 232 is exemplified in the graph of FIG. 9A. The graph of FIG. 9A shows a cooling curve represented by solid line 234 and a heating curve represented by dashed line 236. The abscissa of the graph represents temperature error 230 and the ordinate represents an output signal 240 of the controller 232 that drives either the current driver 212 for heating the SMA wire 90 or a cooling device driver 242 for regulating a cooling device, like the rotary fan 160 described in connection with the embodiment of FIG. 5B, for example. In the graph of FIG. 9A, the point 238 on the abscissa where the two curves 234 and 236 meet may be considered zero temperature error for the purposes of this embodiment. As the temperature error becomes positive, the current drive 212 is driven by the output signal 240 along the curve 236 and similarly, as the error becomes negative, the cooling driver is driven by the output signal 240 along the curve 234. In this manner, the SMA drive valve actuator is heated and cooled in proportion to the temperature set point demand.

While in the present embodiment, the split range controller 232 is described as a proportional controller based on the characteristics exemplified in graph 9A, it is understood that it may also be embodied in the microcontroller U4 with another control strategy, like Proportional plus Integral (PI), Proportional plus Integral plus Differential (PID), Fuzzy Logic, Neural Network, and Rules based on Non-linear control, for example. With these control strategies, the output of the controller 232 would control the rate of heating of the wire 90 or regulate the cooling device 160 based on the temperature error 230.

In operation, if the desired position set point is above the present position of the movable element of the valve, the positive position error 208 is converted into a higher temperature set point 220 by the converter 222, thus rendering an initial positive temperature error signal 230. In response, the controller 232 drives the current driver 212 to regulate the heat to the SMA wire 90, preferably by pulse width modulation, in proportion to the temperature error to force the movable element to move in a direction toward the desired position setting. As the sensed position nears the desired position, the temperature demand will change and as the sensed temperature reaches the temperature demand, the temperature error will eventually be reduced to zero substantially. Likewise, if the position set point is lower than the present position of the movable element, the negative position error 208 is converted into a lower temperature set point 220 by the converter 222, thus rendering an initial negative temperature error signal 230. In response, the controller 232 drives the cooling device driver 942 to regulate cooling of the SMA wire 90 by the cooling device 160 in proportion to the temperature error to force the movable element to move in a direction toward the desired position setting. As the sensed position nears the desired position, the temperature demand will change and as the sensed temperature reaches the temperature demand, the temperature error will eventually be reduced to zero substantially. In either case, a combination of heating and cooling as governed by the position and temperature errors may be used to maintain the movable element at the desired position.

Figure 10A:
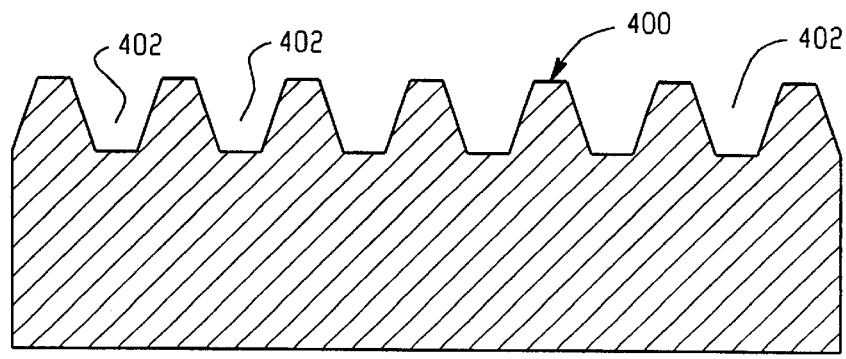
FIGS. 10A, 10B and 10C are cross-sectional views of a bobbin section illustrating various states of a method suitable for embodying yet another aspect of the present invention.
Figure 10B:
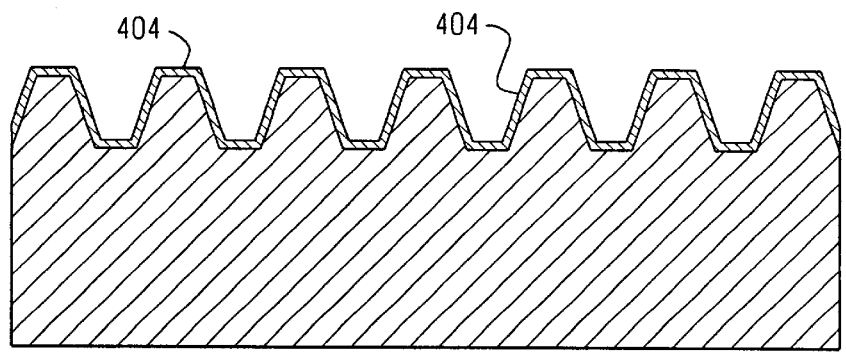
Figure 10C:
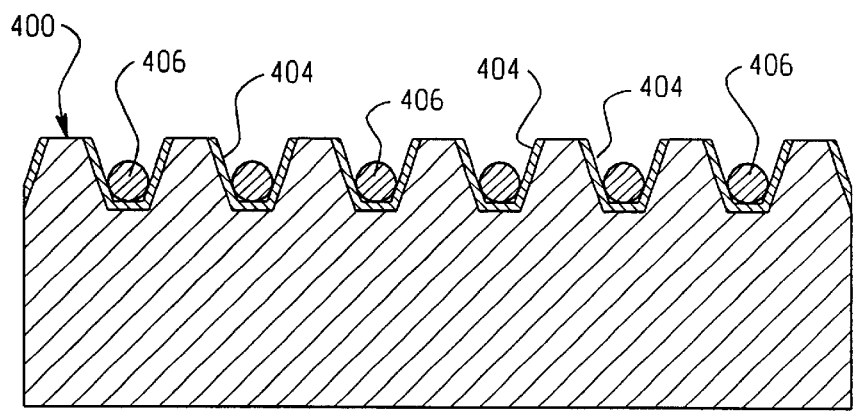

FIGS. 10A, 10B and 10C illustrate a method for configuring a bobbin of non-conductive material for use in the embodiments described in connection with FIGS. 1–4. In each of the FIGS. 10A, 10B and 10C, a section of the bobbin is shown in cross sectional view for convenience of illustration. Referring to FIG. 10A, grooved sections 402 are removed from the surface area 400 of the bobbin. The grooved sections are made slightly larger than the diameter of the SMA wire for acceptance of the windings thereof. Any conventional fabrication technique, like machining or molding, for example, will suffice for this step of the method. Next, as shown in FIG. 10B, a coating of conductive material 404 is applied over both the grooved and non-grooved surfaces of the bobbin. Then, as shown in FIG. 10C, the conductive material on non-grooved surfaces 400 is removed, leaving the conductive material 404 coating only the grooved surfaces 402. The conductive material may be removed by any conventional machining technique, like grinding, sanding or milling, for example. Another technique may be to mask all of the surfaces of the bobbin that are not to be coated with conductive material, i.e. the non-grooved surfaces, with a masking material that resists the conductive material, then apply conductive material to the entire surface of the bobbin (it will not stick to the mask resist) and, remove the masking material. In the alternative, the conductive material 404 may only be applied to the grooved surface areas 402 and any material 404 which laps over onto the surfaces 400 may be machined away. Techniques for selectively applying conductive material to the grooved surfaces include ink-printing or syringe needle deposition, for example. Another technique may be to wind a continuous conductive wire, like copper, for example, into the grooves of the bobbin and then, cut off the excess wire along the bottom of the bobbin. In either case, the SMA wire 406 may be wound into the conductive surface areas 404 to make physical, and thus electrical, contact therewith. Accordingly, those portions of the SMA wire in contact with the conductive surfaces of the bobbin will be essentially bypassed electrically due to the much lower resistance of the conductive material. Therefore the SMA wire windings will require less power overall to achieve the same mechanical advantage.

Figure 11A:
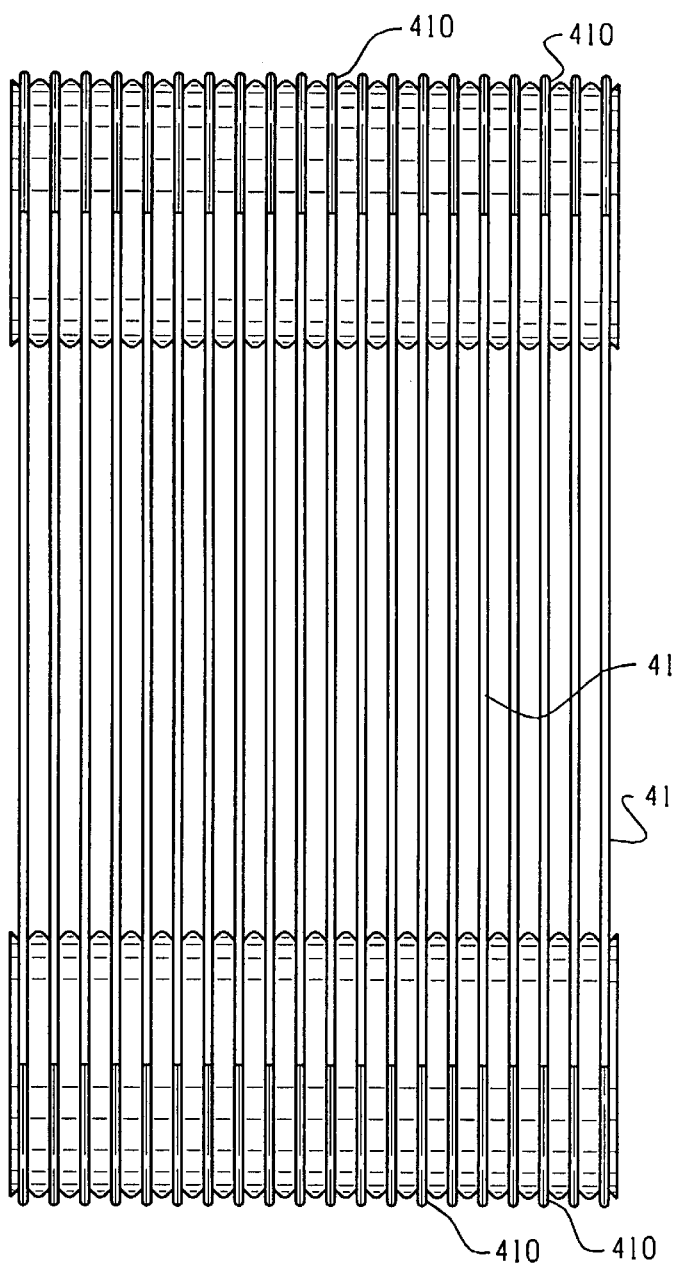
FIG. 11A and 11B are two views of an illustration of SMA wire wound around the two bobbin sections with conductive coated and non-coated wire portions suitable for embodying yet another aspect of the present invention.
Figure 11B:
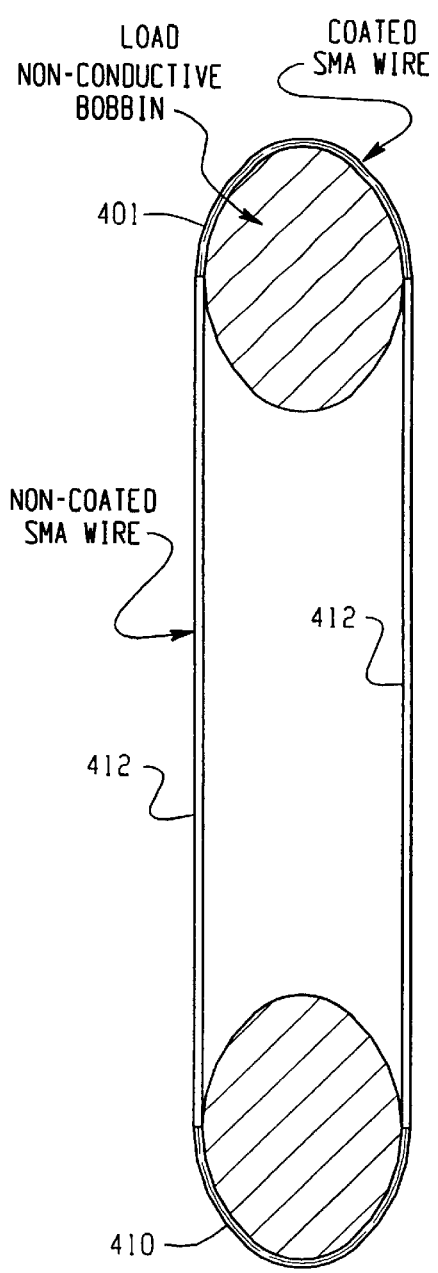

Another method for lowering the required power of the SMA wire to gain the same mechanical advantage is to first coat the surface area of the SMA wire with a conductive material, like copper, for example. Then, wind the coated SMA wire around the bobbin in the grooved areas thereof so that the coated wire windings are in contact with the grooved surfaces. Thereafter, remove the conductive material from the surfaces of the wire not in contact with the grooved surfaces resulting in the structure as shown by the views of FIGS. 11A and 11B. The darkened areas 410 of the windings are the coated surfaces of the wire and the remaining surfaces 412 are uncoated. In this method, the conductive coating of the wire may be removed from areas not in contact with the bobbin by sand blasting the wire after being wound around the bobbin. Another way to remove the coating on the wire not in contact with the bobbin is to cause the wire to go through one or more expansion and contraction cycles after being wound around the bobbin which will cause the coating to flake or peel away due to the difference in expansion and contraction characteristics of the wire and coating materials. Those portions of the wire in contact with the bobbin will not undergo the same degree of expansion and contraction rendering the coating thereon substantially unaffected. The expansion and contraction cycles may be caused by thermal heating of the coated wire, for example.

While the present invention has been described in connection with one or more preferred embodiments herein, it is understood that it should not be limited to any single embodiment. Rather, the present invention and all of the aspects thereof should be construed in broad scope and breadth in accordance with the recitation of the appended claims hereto.

What is claimed is:

1. A fluid control valve having a shape memory alloy (SMA) driven actuator, said valve comprising:
    a valve body for flowing fluid from an inlet port to an outlet port therethrough, said valve body including a movable element positionable in relation to the valve body to control fluid flow through the valve body;
    a bias means for forcing the movable element to a first position;
    a valve actuator including a first frame section coupled to said valve body and fixed in relation to said valve body; a second frame section coupled to said movable element and movable in relation to said valve body; and a multiplicity of SMA wire sections coupled between said first and second frame sections for moving said movable element from said biased first position to a second position when heated.

2. The fluid control valve of claim 1 wherein the bias means includes a spring that forces the movable element to a closed position to prevent fluid flow through the valve body.

3. The fluid control valve of claim 1 including a first bobbin element coupled to the first frame section and a second bobbin element coupled to the second frame section; and wherein the multiplicity of SMA wire sections comprise a single SMA wire wound a multiplicity of times about the first and second bobbin elements.

4. The fluid control valve of claim 3 wherein the first and second bobbin elements comprise an insulating material for electrically isolating the SMA wire windings.

5. The fluid control valve of claim 4 wherein the insulating material comprises polyphenylene sulfide.

6. The fluid control valve of claim 3 wherein the first and second bobbin elements comprises grooves for accepting the SMA wire windings.

7. The fluid control valve of claim 6 wherein the SMA wire windings in contact with the surface of the grooved areas of the first and second bobbin elements are electrically bypassed with an electrically conductive material.

8. The fluid control valve of claim 3 wherein the first and second bobbin elements are cylindrical in shape.

9. The fluid control valve of claim 3 wherein the first and second bobbin elements include flat surfaces oppositely disposed from each other and moveable in relation to one another when the SMA wire is heated, said flat surfaces including a conductive material forming an integral capacitive element for measuring the position of the movable element.

10. The fluid control valve of claim 3 wherein the ratio of the winding radius of the first and second bobbin elements and the diameter of the SMA wire is substantially less than 50:1.

11. The fluid control valve of claim 3 wherein the ends of the SMA wire are terminated at a bobbin element at an inactive region of the wire providing a restraint to strain when the wire is heated.

12. The fluid control valve of claim 11 wherein each end of the SMA wire is disposed through a hole in a bobbin section and wedged into place to form a restraint to strain.

13. The fluid control valve of claim 1 wherein the first frame section is supported from the valve body by at least one guiding element; and wherein the second frame section is supported in relation to the first frame section by the multiplicity of SMA wire sections and is guided through its movement by the guiding element.

14. The fluid control valve of claim 13 wherein the second frame section is guided through its movement along the outside of the first frame section.

15. The fluid control valve of claim 13 wherein the second frame section is guided through its movement along the inside of the first frame section.

16. The fluid control valve of claim 1 wherein the first and second frame sections include substantially flat surfaces of conducting material oppositely disposed from one another and insulated from their respective frame sections to form an integral capacitive element, the capacitance of which changing in proportion to the position of the movable element.

17. The fluid control valve of claim 1 including a housing for enclosing the valve actuator, said housing including openings for allowing air to flow through the valve actuator.

18. The fluid control valve of claim 1 including an electrical controller for controlling the heating of the SMA wire sections by regulating current therethrough.

19. The fluid control valve of claim 18 wherein the electrical controller includes a temperature control means comprising:
    temperature sensing means disposed in proximity to the SMA wire sections to measure temperature and generate an electrical temperature signal representative thereof;
    cooling means for reducing the temperature surrounding the SMA wire sections when activated; and
    temperature controller governed by said electrical temperature signal for activating said cooling means.

20. The fluid control valve of claim 19 wherein the cooling means includes a means for forcing air around the SMA wire sections.

21. The fluid control valve of claim 19 wherein the cooling means is selected from the group consisting of a rotary fan, a Piezo-fan cooling device, and a Peltier cooling device.

22. The fluid control valve of claim 20 including a housing for enclosing the valve actuator, said housing including openings for allowing air to flow through the valve actuator to assist in reducing the temperature inside the housing; and wherein the cooling device being disposed at said housing for forcing air to flow through the housing openings and around the SMA wire sections.

23. The fluid control valve of claim 19 wherein the temperature controller includes means for activating the cooling means as a function of the electrical temperature signal and a temperature set point.

24. The fluid control valve of claim 18 wherein the electrical controller includes a valve position control means comprising:

a capacitive element including opposing plates integral to the valve actuator, the capacitance of which changing in proportion to the movement of the movable element;

means coupled to said opposing plates for generating an electrical position signal in proportion to the capacitance of said capacitive element; and position controller governed by said electrical position signal for regulating current to the SMA wire sections.

25. The fluid control valve of claim 24 wherein the position controller includes means for regulating current to the SMA wire sections by pulse width modulation of the current.

26. The fluid control valve of claim 24 wherein the position controller includes means for regulating current to the SMA wire sections as a function of the electrical position signal and a position set point.

27. The fluid control valve of claim 18 including means for selecting a rate of heating the SMA wire sections; and wherein the electrical controller includes means governed by said selecting means to regulate current to the SMA wire sections.

28. The fluid control valve of claim 27 including means for regulating current to the SMA wire sections by pulse width modulation of the current.

29. The fluid control valve of claim 18 wherein the electrical controller is disposed substantially on a flexible membrane printed circuit assembly.

30. The fluid control valve of claim 1 wherein the SMA wire sections comprise an alloy of titanium and nickel.

* * * * *